(12) United States Patent
Kelly et al.

(10) Patent No.: US 9,367,079 B2
(45) Date of Patent: Jun. 14, 2016

(54) COMPRESSED SAMPLING AND MEMORY

(71) Applicant: West Virginia University, Morgantown, WV (US)

(72) Inventors: Brandon Michael Kelly, Morgantown, WV (US); Brandon David Rumberg, Beckley, WV (US); David W. Graham, Morgantown, WV (US)

(73) Assignee: WEST VIRGINIA UNIVERSITY, Morgantown, WV (US)

( * ) Notice: Subject to any disclaimer, the term of this patent is extended or adjusted under 35 U.S.C. 154(b) by 389 days.

(21) Appl. No.: 13/837,676

(22) Filed: Mar. 15, 2013

(65) Prior Publication Data

US 2014/0281658 A1 Sep. 18, 2014

(51) Int. Cl.
| | | |
|---|---|---|
| G06F 1/04 | (2006.01) | |
| G06F 1/14 | (2006.01) | |
| G06F 1/08 | (2006.01) | |
| G06F 3/05 | (2006.01) | |
| G06F 13/24 | (2006.01) | |
| G06F 9/44 | (2006.01) | |
| H04L 12/24 | (2006.01) | |
| G06F 1/32 | (2006.01) | |
| H04W 52/02 | (2009.01) | |

(52) U.S. Cl.
CPC .............. G06F 1/08 (2013.01); G06F 1/3275 (2013.01); G06F 3/05 (2013.01); *G06F 1/3203* (2013.01); *G06F 1/3293* (2013.01); *G06F 9/4418* (2013.01); *G06F 13/24* (2013.01); *H04L 41/0816* (2013.01); *H04W 52/02* (2013.01); *Y02B 60/1228* (2013.01)

(58) Field of Classification Search
CPC ... G06F 1/3203; G06F 1/3275; G06F 1/3293; G06F 13/24; G06F 9/4418; H04L 41/0816; H04W 52/02
See application file for complete search history.

(56) References Cited

U.S. PATENT DOCUMENTS

| | | | | |
|---|---|---|---|---|
| 4,039,784 | A | * | 8/1977 | Quarton et al. ................ 345/440 |
| 5,555,180 | A | * | 9/1996 | Hilger .................... G01N 29/11 |
| | | | | 702/189 |
| 5,719,810 | A | * | 2/1998 | Lee et al. ................. 365/189.02 |
| 6,233,107 | B1 | | 5/2001 | Minuhin |
| 7,664,620 | B2 | | 2/2010 | Kadir et al. |
| 2010/0115302 | A1 | * | 5/2010 | Cho et al. ....................... 713/310 |
| 2011/0158259 | A1 | * | 6/2011 | Chen et al. ..................... 370/482 |

(Continued)

OTHER PUBLICATIONS

Nyquist-Shannon sampling theorem, Jan. 3, 2006, Wikipedia.*

(Continued)

*Primary Examiner* — Xuxing Chen
(74) *Attorney, Agent, or Firm* — Buckley, Maschoff & Talwalkar LLC

(57) ABSTRACT

Aspects of a low power memory buffer are described. In one embodiment, a sampling rate of a signal is adjusted to identify extrema of a signal. An extrema pulse is generated and, in response to the extrema pulse, a time segment and potential value of the signal are stored in a memory. In other aspects, rising and falling slopes of the signal are tracked to identify a local maximum and a local minimum of the signal. In this scenario, an extrema pulse is generated for each of the local maximum and minimum, and time segment and potential values are stored for the local maximum and minimum. Generally, the storage of analog values of the signal at an adjusted sampling rate is achieved with low power, and the signal may be reconstructed at a later time.

20 Claims, 11 Drawing Sheets

(56) References Cited

U.S. PATENT DOCUMENTS

2013/0214796 A1* 8/2013 Uchida .................. 324/617
2014/0012573 A1* 1/2014 Hung ................ G06F 1/3215
                                                        704/233

OTHER PUBLICATIONS

Homjakovs, I. et al.: "Signal-Dependent Analog-to-Digital Conversion based on MINIMAX Sampling", 2011 IEEE conference (MWSCAS), Aug. 7-10, 2011, Seoul, Korea, 4 pages.

Kruiskamp et al. "A CMOS Peak Detect Sample and Hold Circuit," IEEE Transactions on Nuclear Science, vol. 41, No. 1 (Feb. 1994).

Prodanov et al. "Biquad Gm-C Structures Which Use Double-Output Transconductors," IEEE (1996).

Kumar et al. "An Analog VLSI Chip with Asynchronous Interface for Auditory Feature Extraction," IEEE Transactions on Circuits and Stytems-II: Analog and Digital Signal Processing, vol. 45, No. 5 (May 1998).

De Geronimo et al. "Analog Peak Detector and Derandomizer for High-Rate Spectroscopy," IEEE Transactions on Nuclear Science, vol. 49, No. 4 (Aug. 2002).

Abdalla et al. "An analog VLSI low-power envelope periodicity detector," IEEE Transactions on Circuits and Systems—I: Regular Papers, vol. 52, No. 9 (Sep. 2005).

Borghetti et al. "A Double Polarity CMOS Peak-and-Hold Circuit for Satellite Radiation Detection Systems," 2005.

Alegre et al. "Fast-Settling Envelope Detectors," IMTC2006—Instrumentation and Measurement Technology Conference, Sorrento, Italy (Apr. 2006).

Brogna et al. "n-XYTER—A CMOS Read-Out ASIC for a new Generation of High Rate Multichannel Counting Mode Neutron Detectors," 2006.

D. Wei and A. Oppenheim "Sampling based on local bandwidth," IEEE (2007).

Holleman et al. "A Micro-Power Neural Spike Detector and Feature Extractor in .13µm CMOS," IEEE 2008 Custom Intergrated Circuits Conference (CICC) (2008).

Chen et al. "0.5-µm CMOS Implementation of Analog Heart-Rate Extraction with a Robust Peak Detector," IEEE Transactions on Instrumentation and Measurement (Apr. 2008).

Sawigun et al. "An Ultra Low-Power Peak-Instant Detector for a Peak Picking Cochlear Implant Processor," IEEE (2010).

Lajevardi et al. "Zero-Crossing Detector Based Reconfigurable Analog System," IEEE Journal of Solid-State Circuits, vol. 46, No. 11 (Nov. 2011).

Feizi et al. "Time-stampless adaptive nonuniform sampling for stochastic signals" (2012).

Rumberg and Graham "A low-power magnitude detector for analysis of transient-rich signals," IEEE Journal of Solid-State Circuits, vol. 47, No. 3 (Mar. 2012).

Trakimas and Sonkusale "An Adaptive Resolution Asynchronous ADC Architecture for Data Compression in Energy Constrained Sensing Applications," IEEE Transactions on Circuits and Systems—I: Regular Papers, vol. 58, No. 5 (May 2011).

Dingkun Du et al. "Efficient Speech Edge Detection for Mobile Health Applications," IEEE (2011).

* cited by examiner

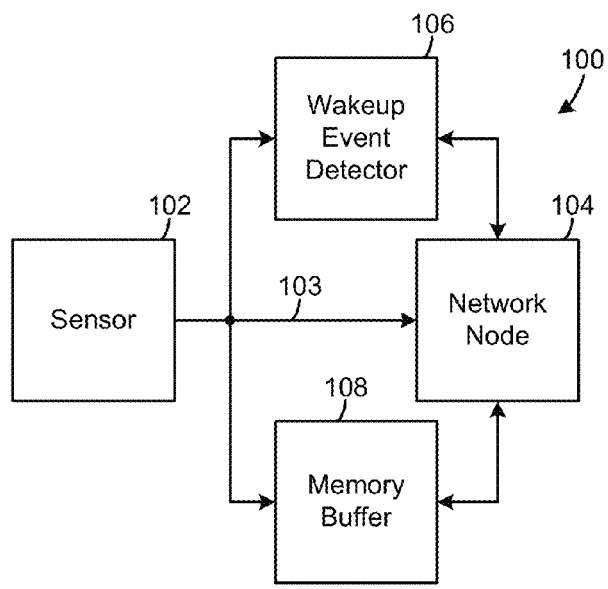
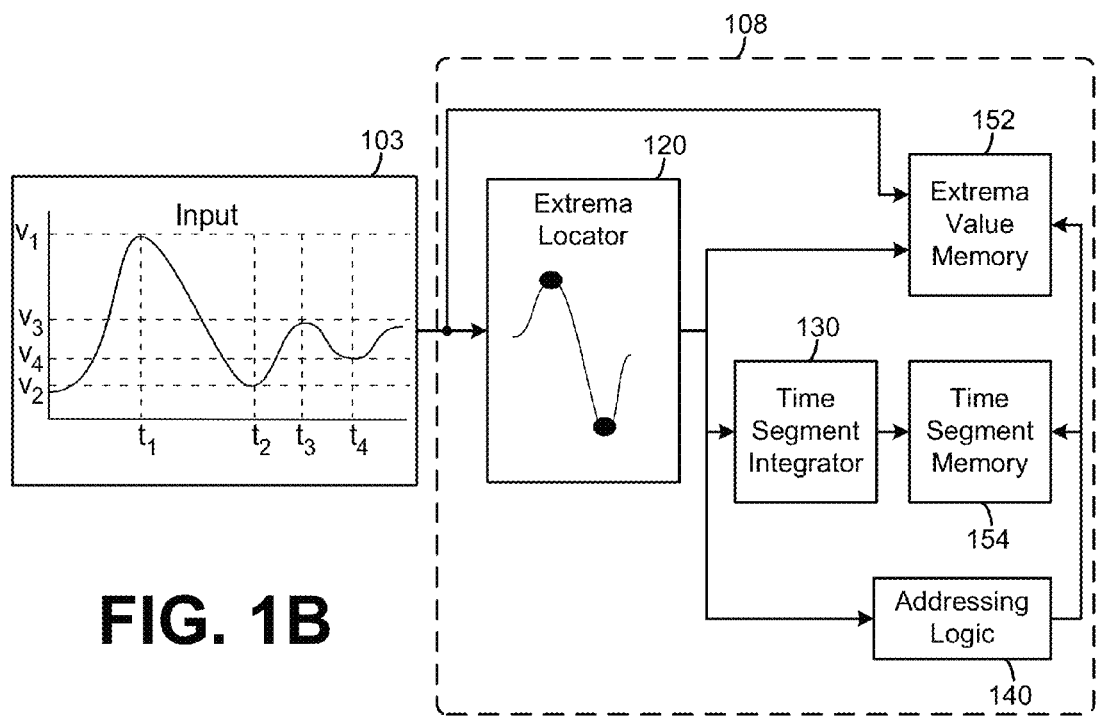

COMPRESSED SAMPLING AND MEMORY

GOVERNMENT LICENSE RIGHTS

This invention was made with government support under contract W911NF-10-2-0109, awarded by the United States Army Research Laboratory. The government has certain rights in the invention.

BACKGROUND

In some resource-constrained systems, sleep states are used to conserve power. For example, wireless sensor networks (WSN) are one type of resource-constrained system that benefits from the use of low-power sleep states. During a sleep state, normal operation of a system (or parts of the system) is halted to conserve energy. The system may be signaled to exit the sleep state by a wakeup event detector circuit, for example, so that certain events can be observed and/or processed. One tradeoff faced during design of sensor network systems is maximizing an amount of time spent in sleep states to conserve power while minimizing any data loss associated with certain important events (including those leading up to and/or including a wakeup event). In systems that rely upon a wakeup circuit to detect certain events during a sleep state, data that should have been captured before, during, or shortly after a wakeup event may be lost.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 1A illustrates a system for adaptive sampling of a signal in a sleep state, according to an example embodiment.

FIG. 1B illustrates elements of a memory buffer of the system for adaptive sampling of FIG. 1A, according to an example embodiment.

DETAILED DESCRIPTION

Figure 2:
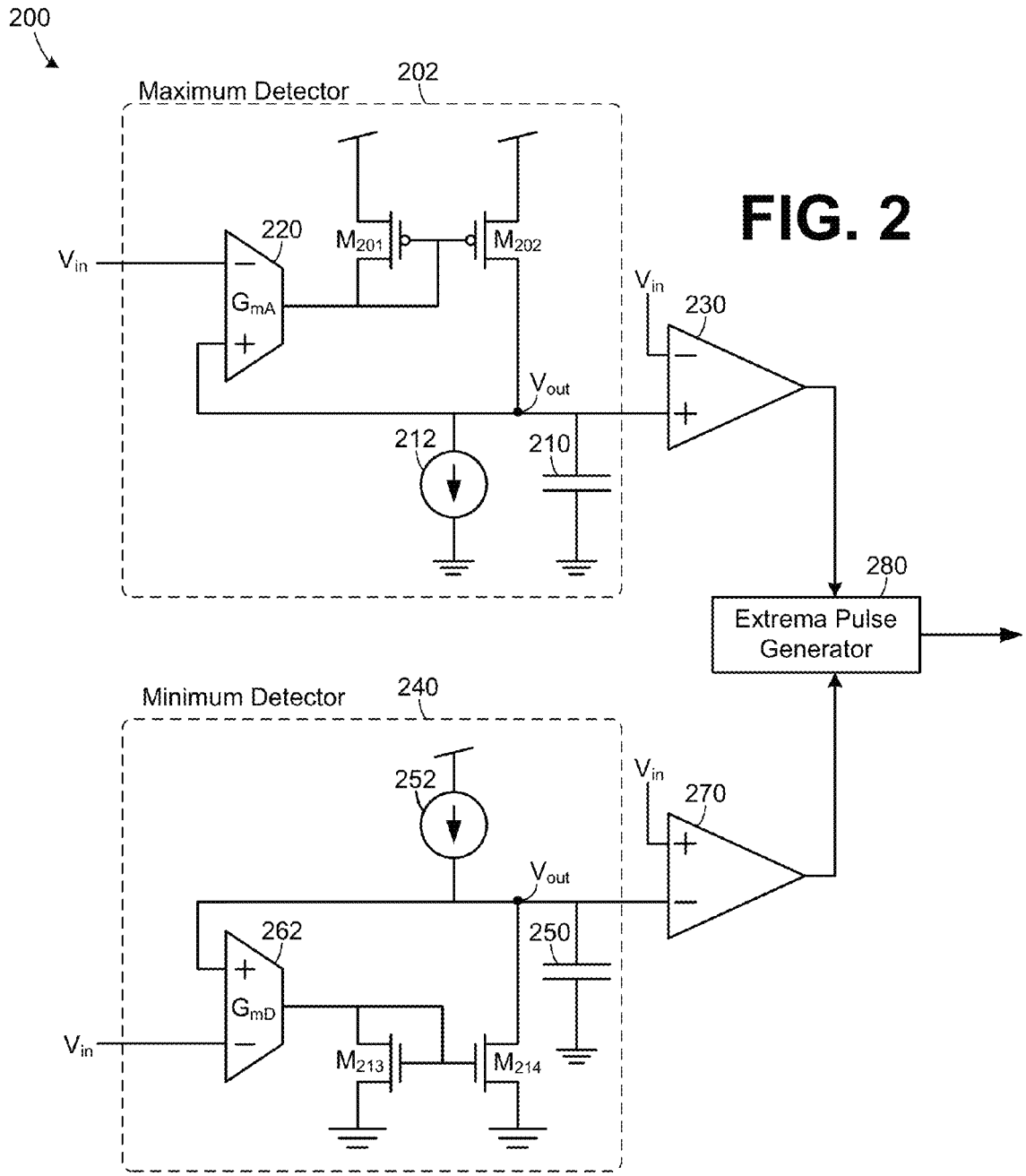
FIG. 2 illustrates an extrema locator circuit arrangement of the memory buffer of FIG. 1B, according to an example embodiment.

As noted above, one tradeoff faced during design of sensor network systems is maximizing an amount of time spent in sleep states to conserve power while minimizing any data loss associated with certain important events (including those leading up to and/or including a wakeup event). In systems that rely upon a wakeup circuit to detect certain events during a sleep state, data that should have been captured before, during, or shortly after a wakeup event may be lost.

In this context, a system for adaptive and compressed sampling is described herein. The system adaptively samples and stores an input signal while remaining elements in a system remain in a sleep state, preserving samples of the input signal that may otherwise be lost. After a wakeup event occurs, a processor of the system can rely upon the stored samples to reconstruct the input signal, mitigating loss of important data and/or features of the input signal that may have been lost due to the sleep state.

As further described below, rather than sampling an input signal at a Nyquist rate of the highest frequency component of the signal, embodiments are described that rely on asynchronous sampling and storage. As compared to traditional Nyquist sampling, which requires sampling an input signal at a frequency greater than twice the highest frequency component of the signal, using the adaptive rate of sampling described herein avoids oversampling during periods of time that the input signal does not contain high frequency components.

According to aspects described herein, a low power memory buffer is described. The memory buffer asynchronously samples a signal, and stores samples of the signal in a memory. The memory buffer operates in parallel with a wakeup event detector to store signal information while other elements of a system remain in a sleep state. To further reduce the power consumption and size of the memory buffer, the number of samples are reduced by sampling only maximum and minimum values of the signal. This approach effectively adapts the sampling rate to an instantaneous (e.g., adapted) Nyquist rate of the signal, minimizing the number of samples needed for accurate reconstruction. Also, a simple, yet powerful, technique for approximating the original signal using only the maximum and minimum values of the signal is described.

Further to these concepts, a sampling rate of a signal is adjusted to identify extrema of a signal. An extrema pulse is generated and, in response to the extrema pulse, a time segment and potential value of the signal are stored in a memory. In other aspects, rising and falling slopes of the signal are tracked to identify a local maximum and a local minimum of the signal. In this scenario, an extrema pulse is generated for each of the local maximum and minimum, and time segment and potential values are stored for the local maximum and minimum. Generally, the storage of analog values of the signal at an adjusted sampling rate is achieved with low power, and the signal may be reconstructed at a later time.

Turning now to the drawings, a general description of exemplary embodiments of a system for adaptive sampling of a signal in a sleep state is provided, followed by a discussion of the operation of the same.

FIG. 1A illustrates a system 100 for adaptive sampling of a signal in a sleep state, according to an example embodiment. The system 100 comprises a sensor 102, a network node 104, a wakeup event detector 106, and a memory buffer 108. The sensor 102 provides a signal 103 to each of the network node 104, the wakeup event detector 106, and the memory buffer 108. The signal 103 may be generated as an output of the sensor 102 based on one or more events or environmental response characteristics, for example, detected by the sensor 102.

Generally, to avoid data loss that may be associated with sleep states, the memory buffer 108 operates in parallel with the wakeup circuit 106. The memory buffer 108 identifies and stores data while the network node 104 remains in a sleep state, permitting signal approximation and/or reconstruction at a later time, based on the stored data, without sacrificing energy savings from the sleep state. It should be appreciated, however, that the embodiments described herein may be used apart from any wakeup mechanism, such as the wakeup event detector 106. As discussed below, the memory buffer 108 may be used as a type of analog-to-digital converter front end, for example, to compress an amount of samples required for certain applications.

In various embodiments, the sensor 102 may comprise any sensor suitable for collecting environmental data such as light, temperature, sound, or other environmental aspects, for example. Additionally or alternatively, the sensor 102 may comprise any sensor suitable for collecting or identifying signal characteristics such as radiated or electromagnetic signals. In exemplary embodiments, the signal 103 comprises an analog signal. However, the signal 103 may comprise a digital signal in certain cases and is not limited to an analog signal.

The network node 104 comprises general purpose logic and/or circuitry for analyzing and processing the signal 103. In various embodiments, the network node 104 may comprise any well-known general or specific purpose discrete circuitry, state machine, arithmetic processor, Application Specific Integrated Circuit (ASIC), or combinations thereof. In certain aspects and embodiments, the network node 104 may be configured to execute computer-readable code modules. In this context, the network node 104 may further include memory that stores computer-readable instructions that, when executed by a processor of the network node 104, directs or configures the network code 104 to perform processes and functions described herein.

The network node 104 may comprise one node of a greater system or network of nodes that monitor conditions collected by sensors. To conserve power, the network node 104 is configured to enter a sleep state. For example, if no information is available for collection by the sensor 102, then the signal 103 may be generated by the sensor 102 without any signal levels or response characteristics for analysis or processing. Especially in this case, the network node 104 may enter a sleep state to conserve power, because no information is present on the signal 103 for processing.

When the signal 103 includes signal levels or response characteristics for analysis or processing, the network node 104 analyzes and/or processes the signal 103, to capture and process representative signal levels, for example, present on the signal 103. The analysis and processing performed on the signal 103 may include sampling, collection (i.e., storage), and analysis. Further, the network node 104 may communicate with additional elements of a greater system of network nodes, to relay information related to the response characteristics of the signal 103.

The wakeup event detector 106 comprises a detector suitable for identifying a particular response on the signal 103. For example, the wakeup event detector 106 may determine a wakeup event including a certain potential value, frequency response, synchronization pattern, or other signal response of the signal 103, and provide a wakeup signal to the network node 104 upon detection of the wakeup event. In turn, the network node 104 is configured to exit the sleep state upon receipt of the wakeup signal. After exiting the sleep state, the network node 104 is configured to analyze and process the signal 103 as described above. In other embodiments, the wakeup event detector may generate the wakeup signal at certain predetermined times or periodically in time, with or without reference to the signal 103.

To avoid data loss generally associated with sleep states as described above, the system 100 includes the memory buffer 108. According to certain aspects described herein, the memory buffer 108 operates in parallel with the wakeup circuit 106. The memory buffer 108 stores signal and response characteristics of the signal 103, while the network node 104 remains in a sleep state, permitting signal approximation by the network node 104 upon exiting the sleep state without sacrificing the energy savings from the sleep state. Additional aspects of the memory buffer 108 are described below in connection with FIG. 1B.

FIG. 1B illustrates elements of the memory buffer 108 of the system 100 of FIG. 1A, according to an example embodiment. As illustrated, the memory buffer 108 comprises an extrema locator circuit 120, addressing logic 140, a time segment integrator 130, an extrema value memory 152, and a time segment memory 154. It is noted that the memory buffer 108 may be used apart from the remaining elements in the system 100 of FIG. 1A. That is, the memory buffer 108 may be used in various applications in which a signal is sampled other than that described in the context of FIG. 1A. For example, the memory buffer 108 may be especially useful in resource-constrained applications, as it offers an efficient means to sample a single for later analysis or processing.

Generally, the extrema locator 120 tracks slopes of the signal 103 to identify maximum and minimum of the signal 103. In various embodiments described below in connection with FIGS. 2, 4A, 5, and 7, the extrema locator 120 comprises a transconductance circuit, a current comparator, and a voltage comparator, for example, among other circuit elements. In one embodiment, the extrema locator 120 comprises a rising transconductance circuit that tracks a rising slope of the signal 103 to identify a local maximum of the signal 103. The extrema locator 120 may further comprise a falling transconductance circuit that tracks a falling slope of the signal 103 to identify a local minimum of the signal 103. In response to each local minimum and local maximum of the signal 103, the extrema locator 120 generates an extrema pulse, as further described below.

The time segment integrator 130 integrates a time period between extrema pulses generated by the extrema locator 120. For example, the time segment integrator 130 may integrate an amount of time that elapses between a current extrema pulse and a previous extrema pulse. In one embodiment, the time segment integrator 130 comprises analog circuitry that integrates charge over the amount of time that elapses between extrema pulses. In this case, a potential value or amount of charge integrated over the amount of time may be representative of the amount of time. For example, a capacitor may be set to a known value at a first extrema pulse, and then charged by a constant current source. When the next extrema pulse is identified, the voltage of the capacitor may be sampled and stored. The stored voltage, along with the known charging rate for the capacitor, can be used to calculate the amount of time between the extrema pulses. In other embodiments, the time segment integrator 130 comprises digital circuitry that counts or tallies an amount of time that elapses between extrema pulses.

The extrema value memory 152 stores potential values of the signal 103 based on or in response to each extrema pulse. That is, for each extrema pulse generated by the extrema locator 120, the extrema value memory 152 stores a voltage or potential value of the signal 103 at the time at which the extrema pulse is generated. Similarly, for each extrema pulse generated by the extrema locator 120, the time segment memory 154 stores a time segment integrated by the time segment integrator 130. Thus, each time the extrema locator 120 generates an extrema pulse, the extrema value memory 152 and the time segment memory 154 store a time segment and potential value associated with the signal 103.

The addressing logic 140 generates addresses for reading from and writing to the extrema value memory 152 and the time segment memory 154. In one embodiment, each of the extrema value memory 152 and the time segment memory 154 comprises a limited number of memory locations, and the addressing logic 150 cycles through a set of addresses for the memory locations. Here, it should be appreciated that the number of memory locations available in the extrema value memory 152 and the time segment memory 154 may be selected to ensure that enough signal samples of the signal 103 are stored for the network node 104 to exit a sleep state in response to a wakeup signal provided by the wakeup event detector 106, without data loss while exiting the sleep state. It is noted, however, that any number of memory locations (i.e., the amount of memory) in the extrema value memory 152 and the time segment memory 154 may be used, based on design considerations such as cost, size, and suitability for the application.

Turning to FIG. 2, an extrema locator circuit arrangement 200 of the memory buffer 108 of FIG. 1B, according to an example embodiment, is illustrated. The circuit arrangement 200 comprises a maximum detector 202, a maximum comparator 230, a minimum detector 240, a minimum comparator 270, and an extrema pulse generator 280. It is noted that the transistors illustrated in FIG. 2 (and the other Figures) are not intended to be limited to any particular type of transistor. That is, the circuit arrangements illustrated in FIGS. 2, 4A, 5, and 7 may be embodied by any suitable type of transistors for the application, in various embodiments. Further, the transistors may be discrete or integrated together on one or more semiconductor chips.

The maximum detector 202 comprises a first operational transconductance amplifier (OTA) 220, a first current mirror comprising transistors $M_{201}$ and $M_{202}$, a current drain 212, and a first capacitor 210. The minimum detector 240 comprises a second OTA 262, a second current mirror comprising transistors $M_{213}$ and $M_{214}$, a current source 252, and a second capacitor 250. The input, $V_{in}$, of the circuit arrangement 200 may comprise the signal 103 of FIG. 1A. The output of the circuit arrangement 200 may be provided to the other elements of the memory buffer 108, as illustrated in FIG. 1B.

The maximum detector 202 and the minimum detector 240 are used to trigger write phases in the extrema value memory 152 and the time segment memory 154, such that signal values of the signal 103 are stored at maximums and minimums of the signal 103. Detection of local maximums and minimums is achieved by parallel operation of the maximum detector 202 and the minimum detector 240.

Referring to the maximum detector 202, the first OTA 220 compares the value of $V_{out}$ stored on the first capacitor 210 with the value of $V_{in}$. When $V_{in} > V_{out}$, the first OTA 220 is active and the first capacitor 210 is charged by the first current mirror (i.e., transistors $M_{201}$ and $M_{202}$) based on control by the first OTA 220. Otherwise, when $V_{in} < V_{out}$, the first OTA 220 does not charge the first capacitor 210. During this time, the current drain 212 continues to drain charge from the first capacitor 210, and the voltage Vout falls over time.

In various embodiments, the current drain 212 may comprise various means for sinking or draining current from the capacitor 210. For example, the current drain 212 may be embodied as a resistor, a constant current source, an adaptive current source, or a type of voltage or charge reset circuit. In the context of a charge reset, the current drain 212 may include a switch (or low resistance short) to ground that discharges substantially all charge from the capacitor 210 upon a certain event. Such a discharge switch may discharge the capacitor 210 upon the identification of a minimum value of $V_{in}$ by the minimum detector 240, for example. In another embodiment, the current drain 212 may set charge in the capacitor 210 to a certain level upon a certain event such as the identification of a minimum value of $V_{in}$.

Generally, the transconductance $G_{mA}$ of the first OTA 220 is biased to supply more charge to the capacitor 210 than the current drain 212 withdraws, when both are active. By biasing the first OTA 220 such that the ratio of $G_{mA}$ and the capacitance of the first capacitor 210 is at least on the order of the frequency of the signal 103, $V_{out}$ will track a rising slope of $V_{in}$ to each local maximum of the signal 103. Then, by using a relatively weak current drain 212, $V_{out}$ will begin to lag behind $V_{in}$ as the signal 103 decays off the local maximum. The operation of the minimum detector 242 is similar to the maximum detector 202, although the minimum detector 242 tracks a falling slope of $V_{in}$ to each local minimum of the signal 103.

Figure 3:
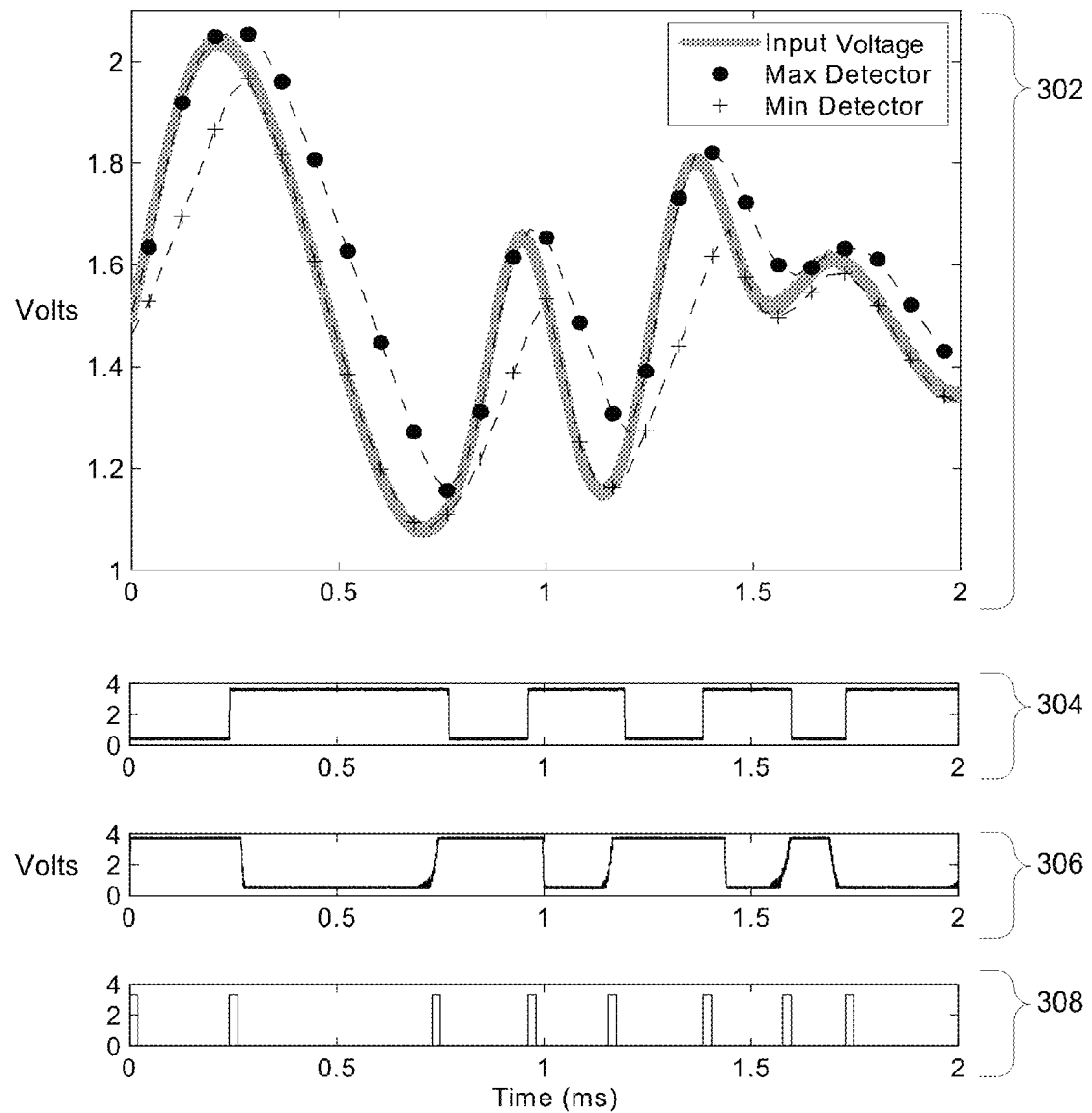
FIG. 3 illustrates example signal waveforms processed by the extrema locator circuit arrangement of FIG. 2.

Referring to FIG. 3, example signal waveforms processed by the extrema locator circuit arrangement 200 of FIG. 2 are illustrated. In FIG. 3, pane 302 illustrates input, maximum detector output, and minimum detector output signal voltages, over time, for the extrema locator circuit arrangement 200 of FIG. 2. Further, pane 304 illustrates a maximum extrema output signal of the first comparator 230 of the circuit arrangement 200, pane 306 illustrates a minimum extrema output signal of the second comparator 270 of the circuit arrangement 200, and pane 308 illustrates an extrema pulse output signal generated by the extrema pulse generator 280 of the circuit arrangement 200.

As illustrated, the output of the maximum detector 202 tracks a rising slope of the input voltage $V_{in}$ to each local maximum, and then lags behind the falling input voltage $V_{in}$ as it decays off the local maximum. Similarly, the output of the minimum detector 240 tracks a falling slope of the input voltage $V_{in}$ to each local minimum, and then lags behind the rising input voltage $V_{in}$ as it rises from the local minimum. The maximum extrema output illustrated in pane 304 is generated by the first comparator 230, and includes a rising edge proximate to each local maximum of the input voltage $V_{in}$. The minimum extrema output illustrated in pane 306 is generated by the second comparator 270, and includes a rising edge proximate to each local minimum of the input voltage $V_{in}$.

The extrema pulse output signal illustrated in pane 308 is generated by the extrema pulse generator 280, and includes a pulse of minimal width at each of the rising edges of the maximum and minimum extrema output signals, as illustrated. In various embodiments, the extrema pulse generator 280 may be embodied by a programmable logic device that generates a pulse at each of the rising edges of the maximum and minimum extrema output signals.

Here, it is noted that the pulses of the extrema pulse output signal are used to trigger write phases in the extrema value memory 152 and the time segment memory 154. Particularly, for each pulse of the extrema pulse output signal, the timer segment integrator 130 outputs a time segment value representative of an amount of time that has elapsed since a previous pulse of the extrema pulse output signal, the time segment memory 154 stores the time segment value, and the extrema value memory stores a potential value of the input signal 103. Thus, when a local maximum or minimum is detected by the memory buffer 108, its voltage value and the time since a last maximum or minimum are stored in the extrema value and time segment memories 152 and 154. These values can be accessed at a later time by the network node 104 (FIG. 1), for later reconstruction or further analysis of the signal 103.

In the context of the example signal waveforms illustrated in FIG. 3, it should be appreciated that the memory buffer 108 of FIGS. 1A and 1B is designed for minimal power consumption, by adapting a sampling rate of the signal 103. That is, the sampling rate is adapted to changes in frequency of the signal 103, to avoid inefficiency. As further described below, sampling at maximums and minimums provides sufficient information about time varying signals to produce an adequate approximation for many applications. Recording only maximums and minimums, for a properly bandlimited signal, yields a sampling rate that adjusts dynamically to the instantaneous Nyquist rate of the signal. As compared to traditional Nyquist sampling, which requires sampling an input signal at a frequency greater than twice the highest frequency component of the signal, using the adaptive rate of sampling described herein avoids oversampling during periods of time that the signal does not contain high frequency components.

Figure 4A:
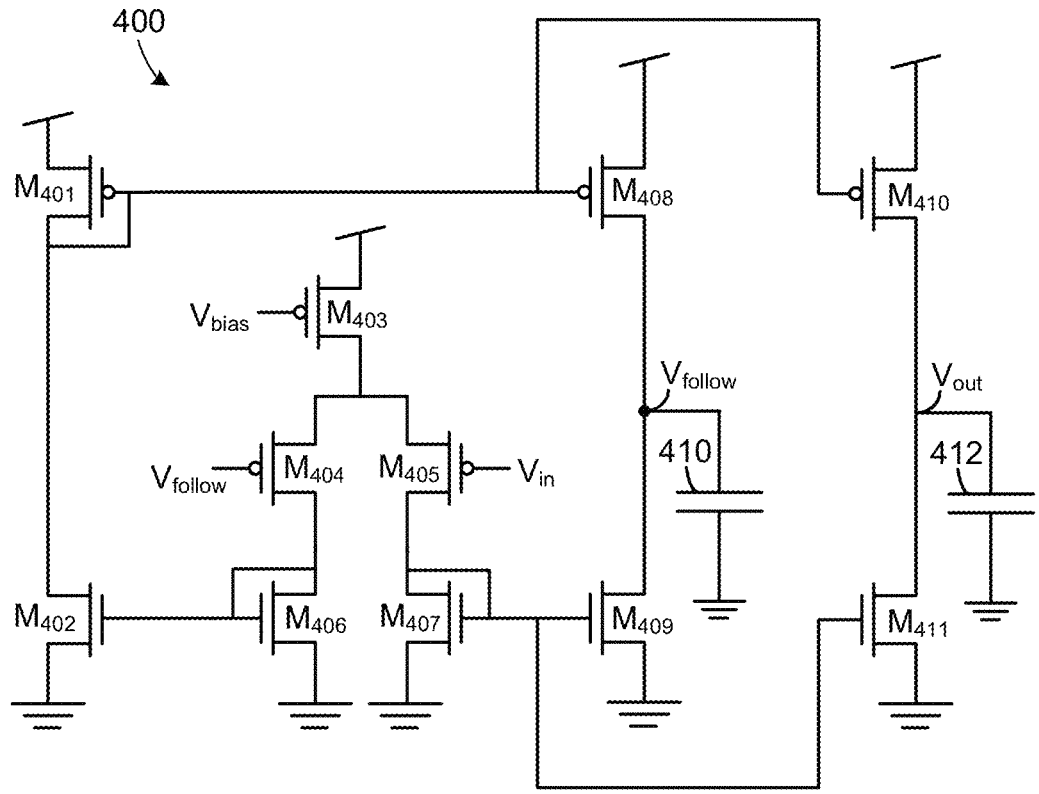
FIG. 4A illustrates another extrema locator circuit arrangement of the memory buffer of FIG. 1B, according to an example embodiment.

It is noted that alternative extrema locator circuit arrangements, as compared to the circuit arrangement 200 illustrated in FIG. 2, are within the scope and spirit of the embodiments described herein. For example, FIG. 4A illustrates another extrema locator circuit arrangement 400 of the memory buffer 108 of FIG. 1B, according to an example embodiment. The extrema locator circuit arrangement 400 comprises an OTA of transistors $M_{401}$-$M_{409}$, a current comparator comprising transistors $M_{410}$ and $M_{411}$, and capacitors 410 and 412. The input, $V_{in}$, of the circuit arrangement 400 may comprise the signal 103 of FIG. 1A. The output of the circuit arrangement 400 may be provided to the other elements of the memory buffer 108, as illustrated in FIG. 1B. Also, the voltage $V_{bias}$ of the transistor $M_{403}$ may be set for a suitable frequency response or slew rate of the OTA in the circuit arrangement 400.

In the circuit arrangement 400, the capacitance of the capacitor 410 is generally larger (e.g., an order of magnitude or more larger) than the capacitance of the capacitor 412. Further, it is noted that the transistors $M_{408}$ and $M_{409}$ may be sized the same as (or similar to) the transistors $M_{410}$ and $M_{411}$ of the current comparator. Thus, based on the same control signals from the OTA of transistors $M_{401}$-$M_{409}$, the capacitors 410 and 412 may be charged and discharged with an equivalent amount of current. In alternative embodiments, the amount of current used to charge and discharge the capacitor 410 may be a scalar multiple amount of the current used to charge and discharge the capacitor 412, based on the same control signals from the OTA of transistors $M_{401}$-$M_{409}$.

Because the capacitance of the capacitor 412 for $V_{out}$ has a smaller capacitance as compared to the capacitance of the capacitor 410 for $V_{follow}$, but a same (or ratioed) charge/discharge current is applied to each, $V_{out}$ will have a different output waveform over time as compared to $V_{follow}$. The shape of the output waveform of each is frequency dependent, but $V_{out}$ and $V_{follow}$ will intersect at (or substantially at) each local maximum and minimum of the input signal $V_{in}$. The combination of smaller capacitance at the capacitor 412 (as compared to the capacitance of the capacitor 410), substantially identical (or ratioed) charge/discharge currents for each of the capacitors 410 and 412, and no explicit feedback results in an intersection of $V_{out}$ and $V_{follow}$ at each local maximum and minimum of the input signal $V_{in}$.

Figure 4B:
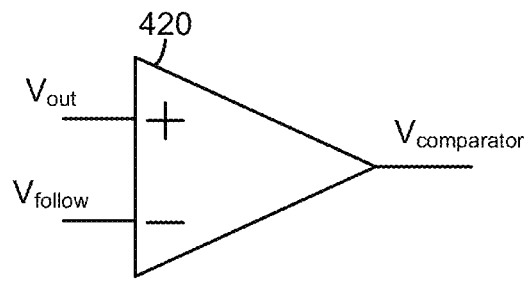
FIG. 4B illustrates inputs and outputs of a comparator circuit of the extrema locator circuit arrangement of FIG. 4A, according to an example embodiment.

FIG. 4B illustrates inputs and outputs of a comparator circuit 420 of the extrema locator circuit arrangement 400 of FIG. 4A, according to an example embodiment. As illustrated, the comparator 420 compares $V_{out}$ to $V_{follow}$ to determine maximums and minimums of $V_{in}$. In other embodiments, the comparator 420 may compare $V_{in}$ to $V_{out}$. In certain aspects, the circuit arrangement 400 of FIG. 4A provides a steeper slope at each maximum and minimum of $V_{in}$, as compared to the circuit arrangement 200 of FIG. 2. As such, better temporal resolution may be obtained by the circuit arrangement 400. It is noted that comparators, such as the comparator 420, typically have a finite region in which they output neither a "hi" nor "low" value for a given comparison of inputs. This finite region is generally referred to as the "resolution" of the comparator. The circuit arrangement 400 of FIG. 4A effectively relaxes resolution requirements in selection of the comparator 420, as well as permitting the voltage difference between the + and − terminals of the comparator to be maximized more quickly. Thus, identification of maximums and minimums can be achieved more quickly.

Figure 5:
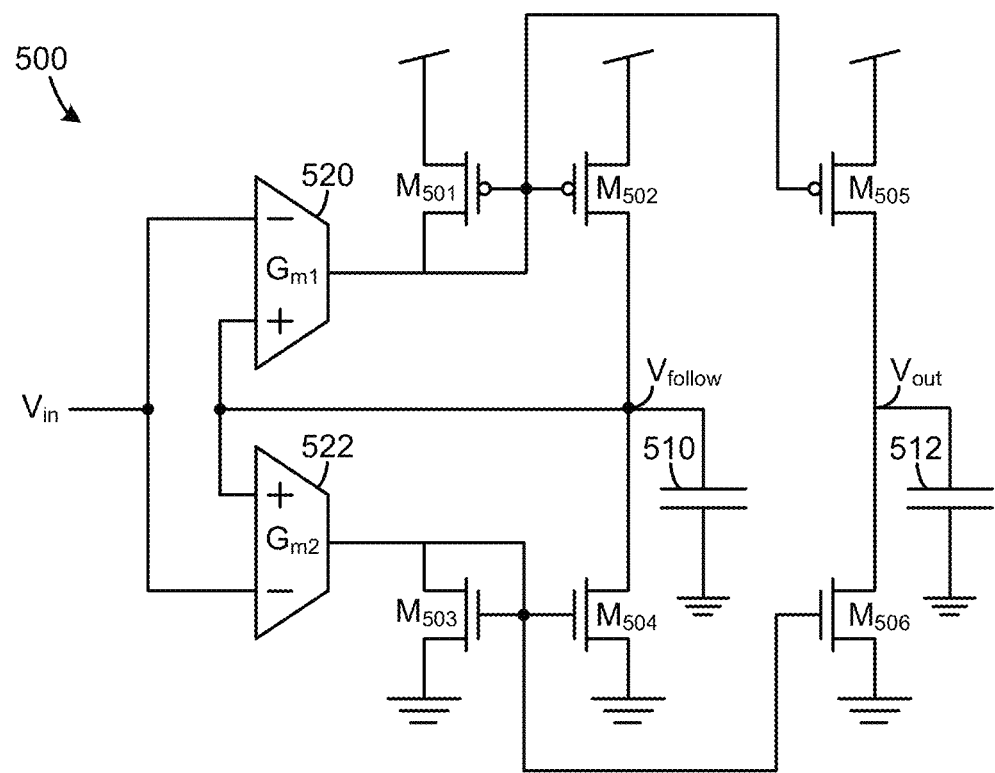
FIG. 5 illustrates another extrema locator circuit arrangement of the memory buffer of FIG. 1B, according to an example embodiment.

As another example of an extrema locator circuit arrangement, FIG. 5 illustrates an extrema locator circuit arrangement 500 of the memory buffer 108 of FIG. 1B, according to an example embodiment. The extrema locator circuit arrangement 500 comprises a first OTA 520, a second OTA 522, a current mirror source comprising transistors $M_{501}$ and $M_{502}$, a current mirror sink comprising transistors $M_{503}$ and $M_{504}$, a current comparator comprising transistors $M_{505}$ and $M_{506}$, and capacitors 510 and 512. The input, $V_{in}$, of the circuit arrangement 500 may comprise the signal 103 of FIG. 1A. It is also noted that the circuit arrangement 500 additionally relies upon a comparator such as the comparator 420 of FIG. 4B, for comparing $V_{out}$ and $V_{follow}$ (or $V_{out}$ and $V_{in}$). The output of the circuit arrangement 500 may be provided to the other elements of the memory buffer 108, as illustrated in FIG. 1B.

In the circuit arrangement 500, the capacitance of the capacitor 510 is generally larger (e.g., an order of magnitude or more larger) than the capacitance of the capacitor 512. As compared to the circuit arrangement 400, the circuit arrangement 500 comprises two OTAs, 520 and 522, for controlling an amount of current sourced to and sunk from the capacitors 510 and 512. Thus, in a manner similar to that described above for the circuit arrangement 400 of FIG. 4A, because the capacitance of the capacitor 512 for $V_{out}$ has a smaller capacitance as compared to the capacitance of the capacitor 510 for $V_{follow}$, $V_{out}$ will have a different output waveform over time as compared to $V_{follow}$.

Figure 6:
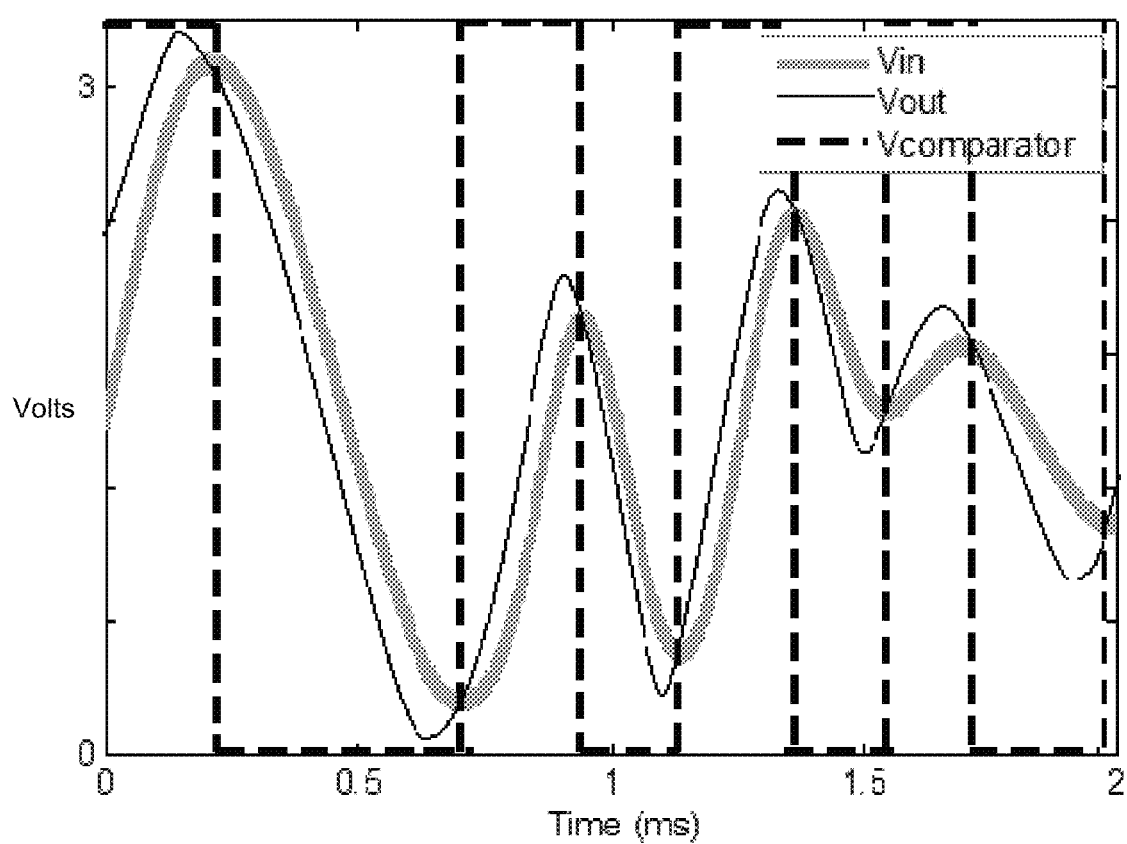
FIG. 6 illustrates example input and output signal waveforms processed by the extrema locator circuit arrangement of FIG. 5.

FIG. 6 illustrates example input and output signal waveforms processed by the extrema locator circuit arrangement 500 of FIG. 5. In FIG. 6, $V_{in}$ and $V_{out}$ of the circuit arrangement 500 are illustrated, along with a $V_{comparator}$ output signal provided by the comparator 420 of FIG. 4B, for example. As illustrated, the $V_{comparator}$ output signal comprises edges on maximums and minimums of $V_{in}$. It is noted that the circuit arrangement 500 of FIG. 5 provides a larger voltage differential (i.e., a faster transition) at each maximum and minimum of $V_{in}$, as compared to the circuit arrangement 200 of FIG. 2 (see also FIG. 3). As such, better temporal resolution may be obtained by the circuit arrangement 500.

Figure 7:
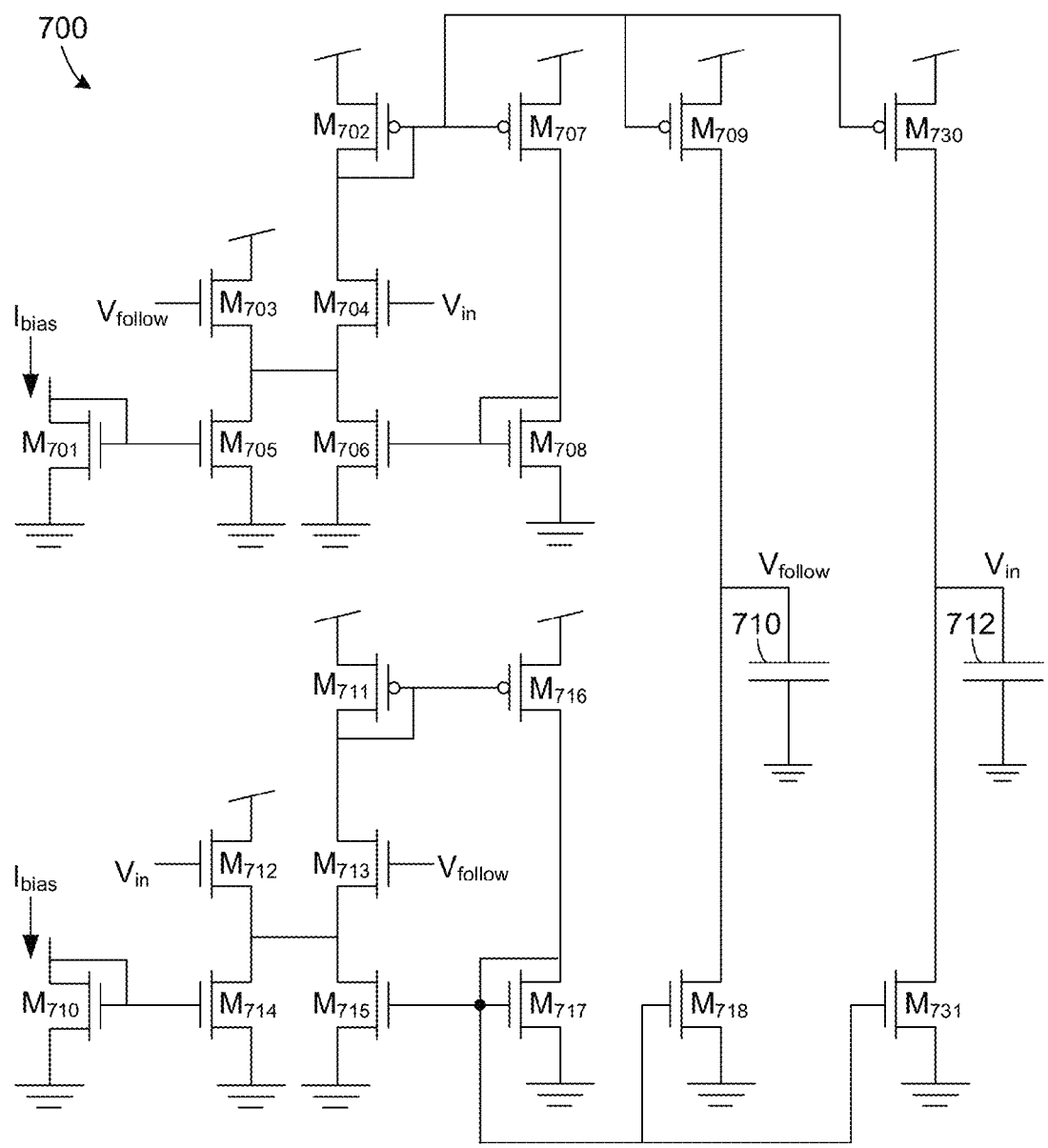
FIG. 7 illustrates an adaptively biased extrema locator circuit arrangement of the memory buffer of FIG. 1B, according to an example embodiment.

FIG. 7 illustrates an adaptively biased extrema locator circuit arrangement 700 of the memory buffer 108 of FIG. 1B, according to an example embodiment. The adaptively biased extrema locator circuit arrangement 700 comprises an OTA comprising transistors $M_{701}$-$M_{718}$, a current comparator comprising transistors $M_{730}$ and $M_{731}$, and capacitors 710 and 712. The input, $V_{in}$, of the circuit arrangement 700 may comprise the signal 103 of FIG. 1A. It is also noted that the circuit arrangement 700 additionally relies upon a comparator such as the comparator 420 of FIG. 4B, for comparing $V_{out}$ and $V_{follow}$ (or $V_{out}$ and $V_{in}$). The output of the circuit arrangement 500 may be provided to the other elements of the memory buffer 108, as illustrated in FIG. 1B. Also, the current $I_{bias}$ of each of the transistors $M_{701}$ and $M_{710}$ may be set for a suitable frequency response or slew rate of the OTA in the circuit arrangement 700.

In the circuit arrangement 700, the capacitance of the capacitor 710 is generally larger (e.g., an order of magnitude or more larger) than the capacitance of the capacitor 712. In a manner similar to that described above for the circuit arrangement 400 of FIG. 4A, because the capacitance of the capacitor 712 for $V_{out}$ has a smaller capacitance as compared to the capacitance of the capacitor 710 for $V_{follow}$, $V_{out}$ will have a different output waveform over time as compared to $V_{follow}$. This difference in output may be identified by the comparator 420 of FIG. 4B, for example, and provided as an extrema output signal.

Figure 8:
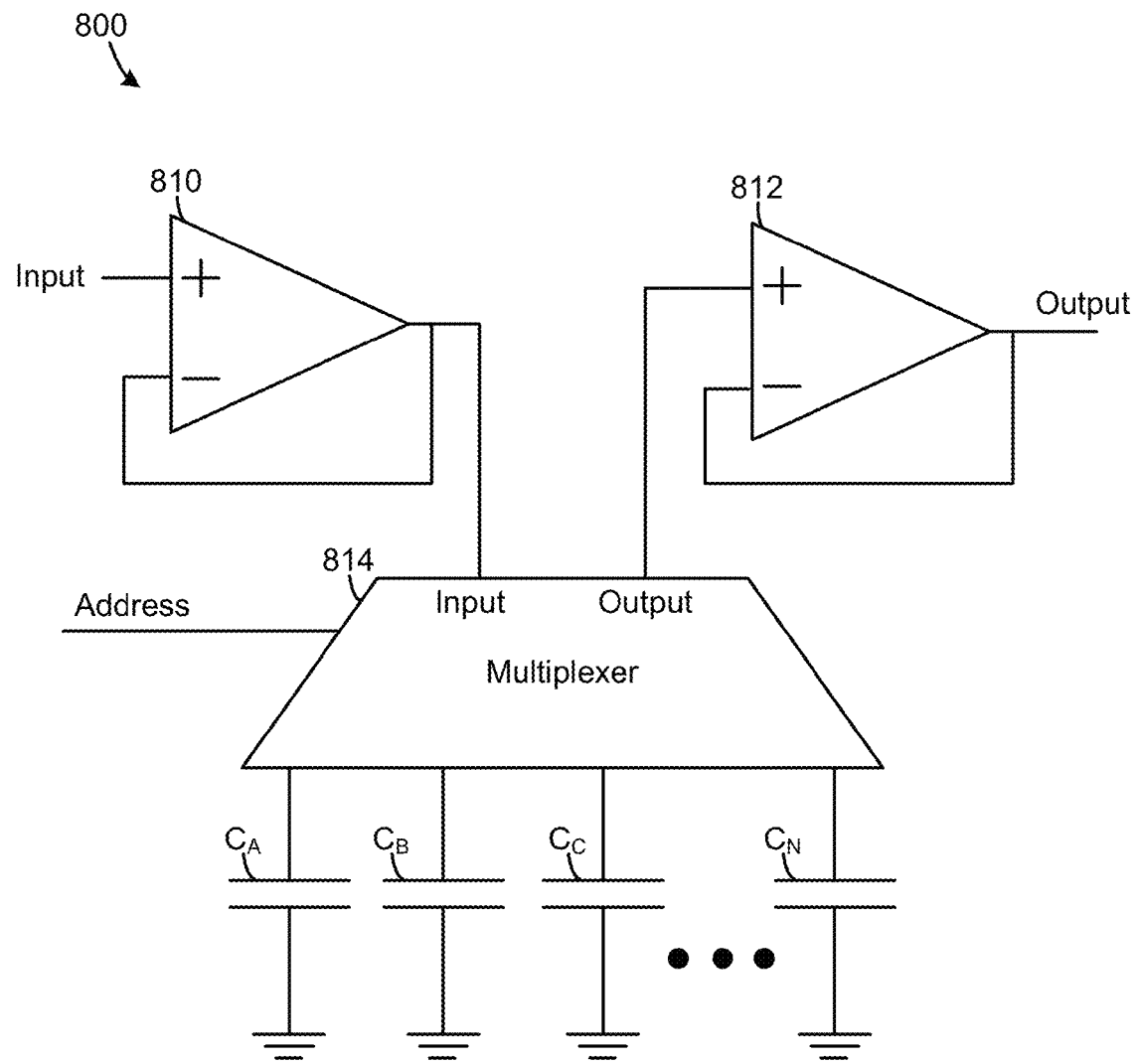
FIG. 8 illustrates an analog memory of the memory buffer of FIG. 1B, according to an example embodiment.

Turning to FIG. 8, an analog memory 800 of the memory buffer 108 of FIG. 1B, according to an example embodiment, is illustrated. The analog memory 800 comprises an input impedance buffer 810, an output impedance buffer 812, a memory element access multiplexer 814, and plurality of analog memory elements $C_A$-$C_N$. In one embodiment, each of the extrema and time segment value memories 152 and 154 (FIG. 1B) may be embodied by the analog memory 800.

To store an analog value, one of the analog memory elements $C_A$-$C_N$ is addressed via the address control signal of the multiplexer 814. The addressing logic 140 (FIG. 1B) may generate and provide an address control signal to the multiplexer 814, according to which analog memory element $C_A$-$C_N$ is next to store a sample of the input signal 103 (FIG. 1B). In one embodiment, the analog memory 800 may be relied upon as a type of ring buffer. That is, the addressing logic 140 may address each of the memory elements $C_A$-$C_N$ in a round-robin sequence, and the number of the memory elements $C_A$-$C_N$ may be selected to ensure that enough signal samples of the signal 103 are stored for the network node 104 to exit a sleep state without loss of data or information from the signal 103, for example, although the number of memory elements $C_A$-$C_N$ may be selected based on other considerations, such as size, cost, and suitability for the application.

Once a memory element is addressed, an analog value for storage in the memory 800 is applied to the input of the buffer 810, and provided to an input of the multiplexer 814 for coupling to the addressed memory element. Similarly, once a memory element is addressed, an analog value may be read out from the multiplexer 814 via the output buffer 812. It is noted that the arrangement of the elements of the analog memory 800 are provided by way of example only, as other equivalent arrangements are within the scope and spirit of the embodiments described herein.

It is noted that the analog memory 800 is configured to store analog or continuous-valued voltages in the memory elements $C_A$-$C_N$. Thus, it is not necessary to convert analog signals (e.g., analog voltages) to digital form before storing representations of them. In this context, the analog memory 800 may permit the storage of time segment and potential values related to the signal 103 with reduced power, depending upon the leakage of the memory elements $C_A$-$C_N$ and other factors.

In other embodiments, although the amount of power consumed by the analog memory 800 may be sufficiently low for some applications, the analog memory 800 may not be feasible for storing data at moderate-to-high levels of precision. Further, although architecture of the analog memory 800 is simple, the duration of storage of analog values is limited by leakage of the capacitive memory elements $C_A$-$C_N$. Increasing the storage time by using larger capacitive elements or the use of active leakage reduction requires a higher cost in area or power. In this context, certain embodiments of the memory buffer 108 (FIG. 1A) may rely upon digital memory for storage of samples of the signal 103.

Generally, if the memory buffer 108 relies upon a digital memory for storage of samples of the signal 103, then the digital memory would comprise an analog-to-digital converter (ADC), an impedance buffer to drive an input of the ADC, a random access memory array, and a state machine to control operation of the digital memory, among other elements. In various embodiments, any suitable random access memory may be used (e.g., SRAM, Flash, etc.) for storage of samples. The ADC may be relied upon to convert analog representations of the potential of the input signal 103 into digital form, before storing them into the random access array. As for time segments between maximums and minimums of the signal 103, the time segments may be generated by the time segment integrator 130 in digital form for direct storage into the random access array. Alternatively, the time segments may be generated by the time segment integrator 130 in analog form and converted into digital form for storage.

Figure 9A:
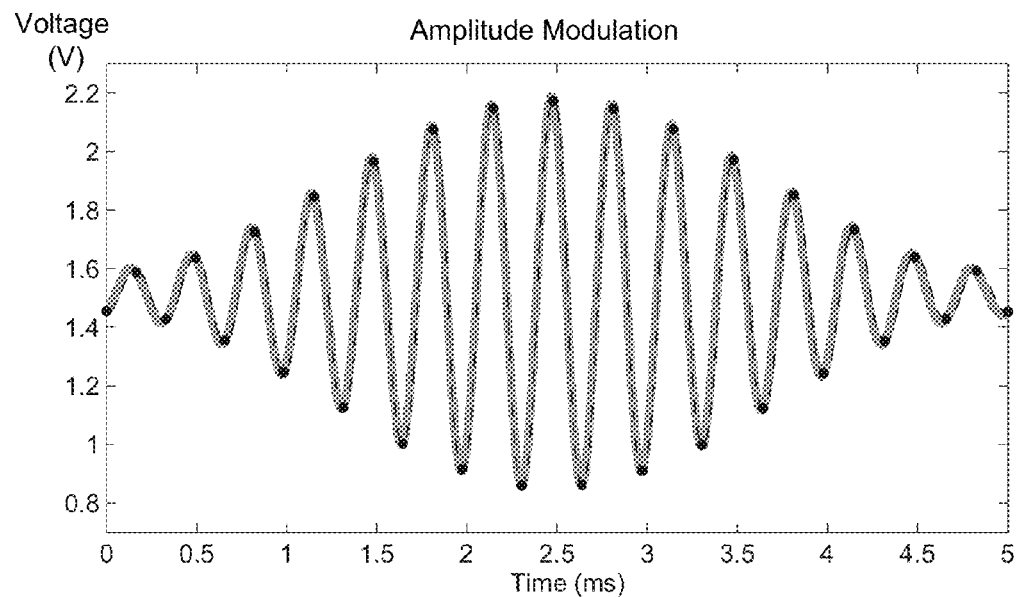
FIGS. 9A and 9B illustrate example sampling patterns of input signals processed by the memory buffer of FIG. 1B.
Figure 9B:
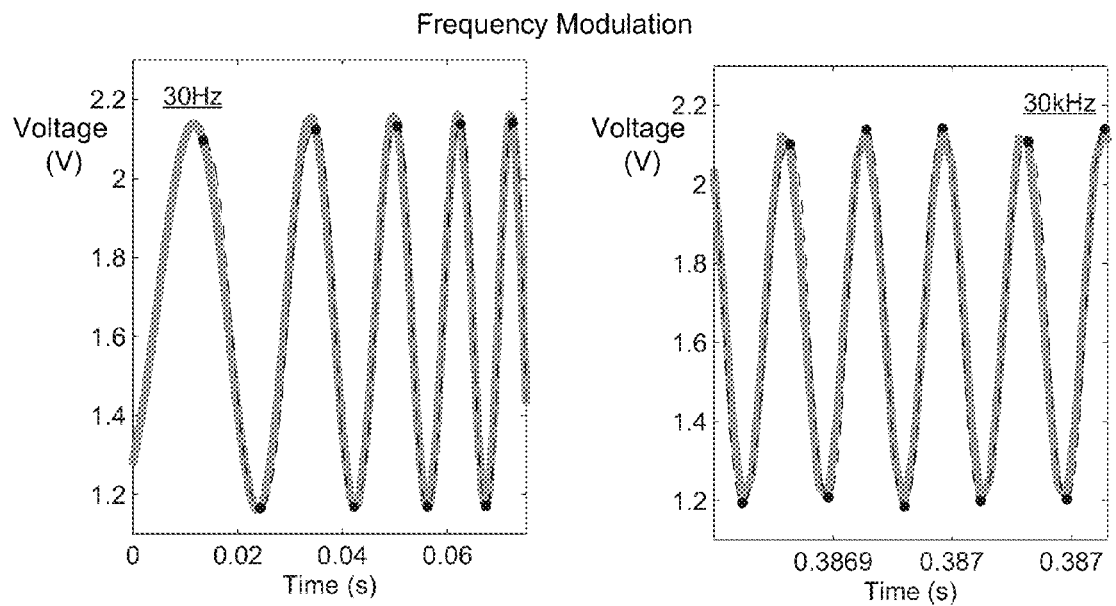

FIGS. 9A and 9B illustrate example sampling patterns of input signals processed by the memory buffer 108 of FIG. 1B. Particularly, FIG. 9A illustrates an example sampling of maximums and minimums of an amplitude modulated waveform, as taken by the memory buffer 108 of the system 100 of FIG. 1B. Similarly, FIG. 9B illustrates an example sampling of maximums and minimums of frequency modulated waveforms at 30 Hz and 30 kHz, as taken by the memory buffer 108 of the system 100 of FIG. 1B. Here, the adaptive sampling rate of the memory buffer 108 is clearly illustrated.

Figure 10A:
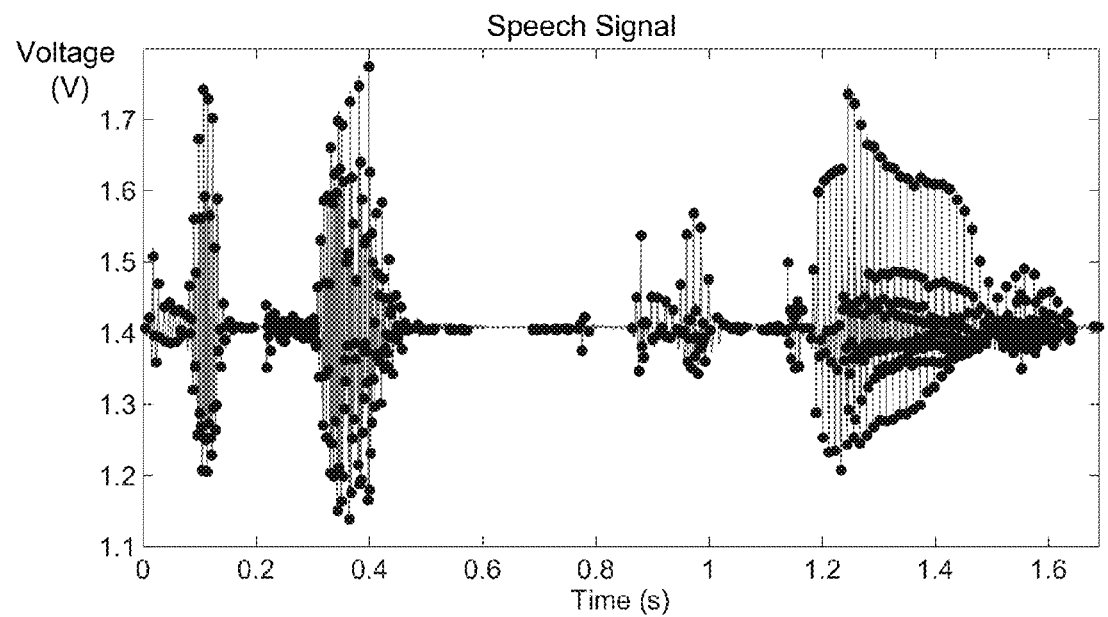
FIGS. 10A and 10B illustrate example input and reconstructed signals processed by the memory buffer of FIG. 1B.
Figure 10B:
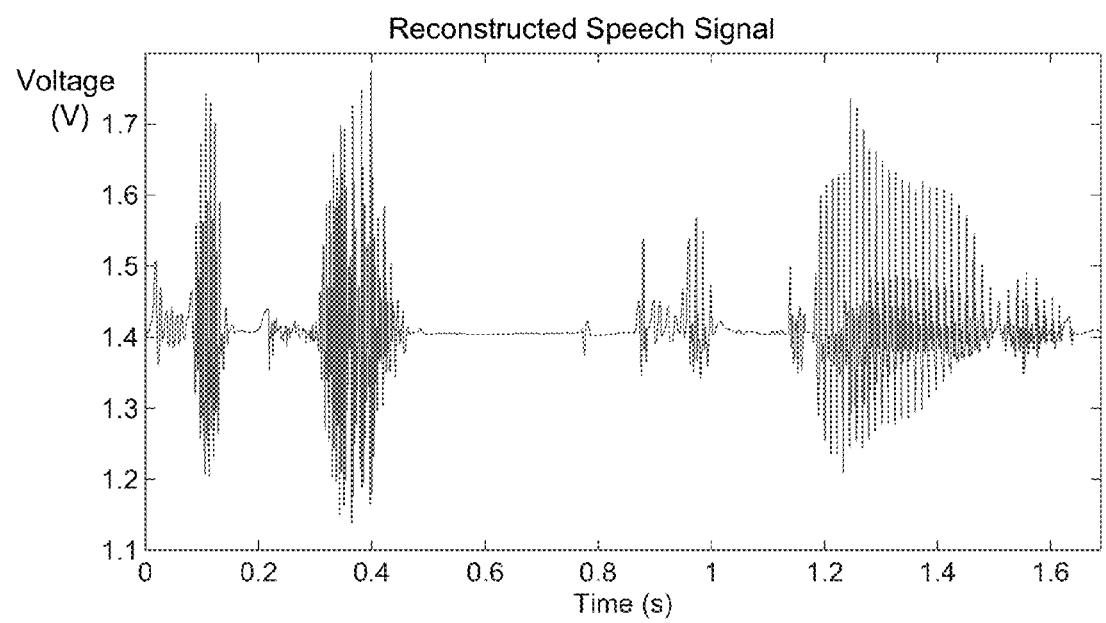

FIGS. 10A and 10B illustrate example input and reconstructed signals processed by the memory buffer 108 of FIG. 1B. Particularly, FIG. 10A illustrates an example sampling of maximums and minimums of a speech signal, as taken by the memory buffer 108 of the system 100 of FIG. 1B. FIG. 10B illustrates an example reconstruction of the speech signal of FIG. 10A, using the maximums and minimums of FIG. 10A.

The reconstructed speech signal of FIG. 10A demonstrated adequate approximation using less resources as compared to Nyquist sampling, for example. In total, 652 samples were recorded, and the highest frequency captured was 3125 Hz. If a constant sampling rate were used, conventional (i.e., Nyquist) techniques would suggest that a much higher sampling frequency would be necessary, and a total of 10556 samples, for example, would have to be recorded. In addition to the savings in sample storage afforded by the adapted sampling rate, lower power was required.

The reconstructed speech signal of FIG. 10A was reconstructed using an interpretation of the Bézier curve formula given by equation (1) below.

$$B(x)=(1-x)^3 P_0+3(1-x)^2 x P_1+3(1-x)x^2 P_2+x^3 P_3, x \in [0,1] \qquad (1)$$

The Bézier curve formula above generates points along a smooth curve specified by endpoints $P_0$ (at x=0) and P (at x=1), and concavity points $P_1$ and $P_2$. Equation (1) may be used sample-by-sample to interpolate between every pair of adjacent maximum and minimum values. Thus, the maximum and minimum samples are used to generate segments between them, to create a full approximation of the original signal. For each segment, equation (1) is applied to the voltage and time values separately. By understanding that all sample values are located where the derivative of the input equals zero (i.e., where the slope is zero), the Bézier formula can be simplified by setting the points $P_1$ and $P_2$ to be equal to the maximum and minimum locations. Accordingly, the equation for interpolating voltage between samples k−1 and k is provided by equation (2) below.

$$V(x) = (1-x)^3 V_k + 3(1-x)^2 x V_k + 3(1-x) x^2 V_{k-1} + x^3 V_{k-1} \quad (2)$$

The result of equation (2) is a nearly sinusoidal-shaped curve that spans the specified amplitudes. In one embodiment, the time vector is interpolated similarly, except that the concavity points are set to the midpoint of the time interval $T_{kmid} = (T_k + T_{k-1})/2$, as provided by equation (3) below.

$$T(x) = (1-x)^3 T_k + 3(1-x)^2 x T_{kmid} + 3(1-x) x^2 T_{kmid} + x^3 T_{k-1} \quad (3)$$

The result of equation (3) is a vector of time values that shift the sinusoidal curve to the appropriate time endpoints. In alternative embodiments, the concavity points may be set to points other than the midpoint of the time interval, and the time vector may be interpolated according to other shifts.

The Bézier equation provides a suitable method for reconstructing a signal from its maximum and minimum values, as indicated by FIG. 10B. The application of the Bézier equation may be performed by processing circuitry of the network node 104 of the system 100 of FIG. 1, for example, or by another suitable processor apart from the system 100.

In other embodiments, a signal may be reconstructed by applying 'sinc' waves centered about each sample point and scaled for amplitude. Each sinc wave is scaled so that the first zeros of the wave (i.e., the first time the wave crosses zero) occur at the time of a next sample of the signal. However, it is noted that, due to the adaptive-sampling rate scheme applied according to the embodiments described herein, samples of signals may not be evenly spaced. One solution is to apply an 'asynchronous sinc wave' at each sample location. That is, a left half of the sinc wave is scaled so that it fits a frequency of the sample approaching from the left, and a right half of the sinc wave is scaled so that it fits a frequency of the sample approaching from the right. The application of this technique may also be performed by processing circuitry of the network node 104 of the system 100 of FIG. 1, for example, or by another suitable processor apart from the system 100.

Figure 11:
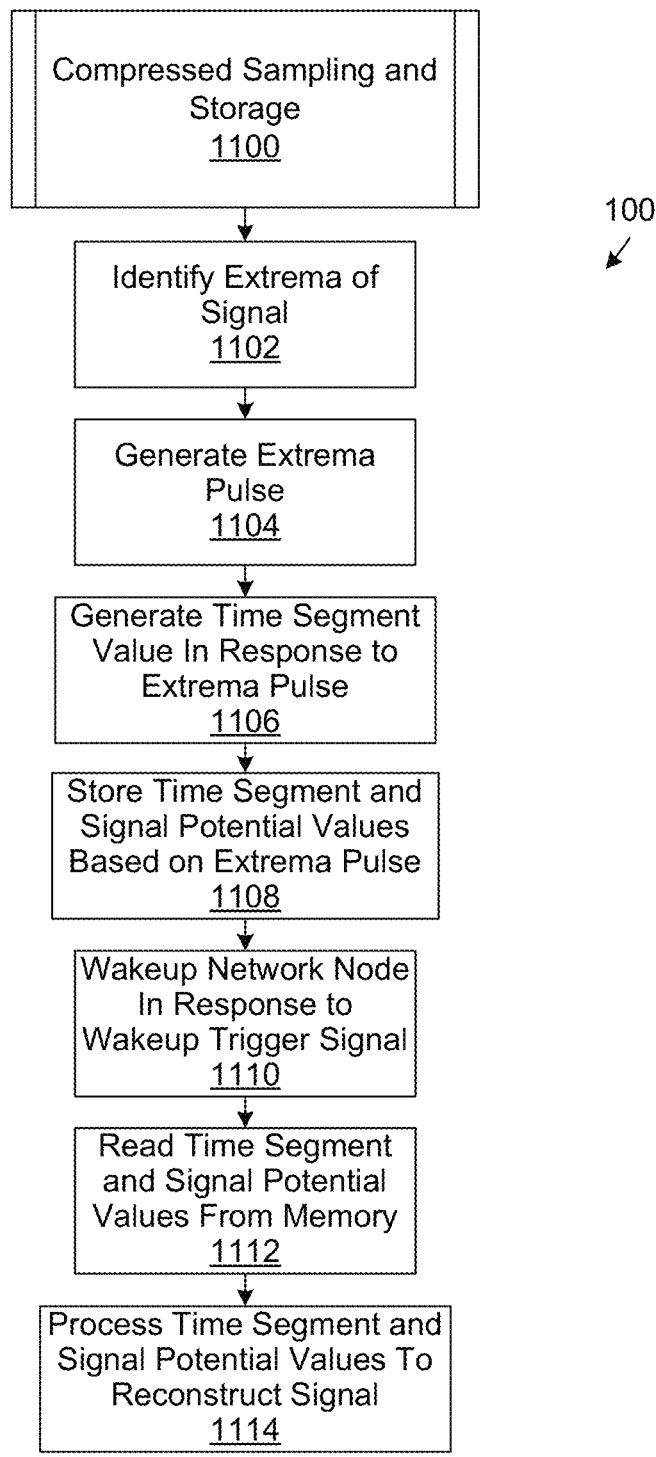
FIG. 11 illustrates an example process flow diagram of a process of compressed sampling and storage performed by the system for adaptive sampling of FIG. 1 according to an example embodiment.

Referring next to FIG. 11, an example process flow diagram illustrating a process of compressed sampling and storage performed by the system 100 of FIG. 1 is provided. It should be appreciated that the flowchart of FIG. 11 provides merely one example functional arrangement that may be employed to implement the operations of the system 100, as described herein. In certain aspects, the flowchart of FIG. 11 may be viewed as depicting an example of steps performed by the system 100 according to one or more embodiments. In alternative embodiments, a system similar to the system 100 may perform the processes illustrated in FIG. 11.

FIG. 11 illustrates an example process flow diagram of a process 1100 of compressed sampling and storage performed by the system for adaptive sampling of FIG. 1 according to an example embodiment. At reference numeral 1102, the process 1100 includes identifying one or more extrema of a signal for sampling. As discussed above, the signal may be generated by the sensor 102 of FIG. 1A, and the identifying may be performed by the extrema locator circuit 120 of FIG. 1A. In various embodiments, identifying one or more extrema of the signal for sampling may be performed at an adaptive or instantaneous Nyquist sampling rate of the signal.

In the context of adaptive identification of extrema at reference numeral 1100, the identification may include tracking slopes of the signal to identify local maximums and minimums of the signal. In other words, the sampling may include tracking a rising slope of the signal to identify a local maximum of the signal and tracking a falling slope of the signal to identify a local minimum of the signal. Any of the extrema locator circuit arrangements illustrated in FIG. 1A, 1B, 2, 4A, 5, or 7 may be relied upon for identifying extrema at reference numeral 1102.

At reference numeral 1104, the process 1100 includes generating an extrema pulse for the one or more extrema of the signal. In one embodiment, an extrema pulse is generated at reference numeral 1104 for each extrema (i.e., maximums and minimums) of the signal identified at reference numeral 1102. As described above, extrema pulses may be generated by the extrema pulse generator 20 of FIG. 2 or the comparator 420 of FIG. 4B, for example.

At reference numeral 1106, the process 1100 includes generating a time segment value in response to each extrema pulse generated at reference numeral 1104. As described above, each time segment value is representative of a time period between one extrema pulse and a previous extrema pulse. The generation of the time segment value may be performed by the time segment integrator 130 of FIG. 1B, for example, and may include integrating charge or counting an amount of time between one extrema pulse and a previous extrema pulse.

At reference numeral 1108, the process 1100 includes storing the time segment value generated at reference numeral 1106 and a potential value of the signal in a memory. Storing at reference numeral 1108 may be performed in response to each extrema pulse generated at reference numeral 1104. The time segment and potential values may be stored in either an analog memory, such as the analog memory 800 of FIG. 8, or in a digital memory, as described above.

At reference numeral 1110, the process 1100 includes waking up a network node in response to a wakeup trigger signal. For example, as described above in connection with FIG. 1A, in response to a wakeup event trigger signal generated by the wakeup event detector 106, the network node 104 may wakeup at reference numeral 1110. At reference numeral 1112, the process 1100 includes reading, by a processing circuit, time segment and potential values from a memory. That is, in one embodiment, the process 1100 includes reading, by a processing circuit of the network node 104, time segment and potential values from the memory relied upon to store time segment and potential values at reference numeral 1108.

At reference numeral 1114, the process 1100 includes processing the time segment and potential values to reconstruct the signal. Here, the time segment and potential values read at reference numeral 1112 are processed to reconstruct a signal. The reconstruction may be performed using the Bézier formula or sinc waves, as described above, in various embodiments. Alternative methods of reconstruction at reference numeral 1114 are within the scope and spirit of the embodiments described herein.

The flowchart or process of FIG. 11 is representative of certain processes, functionality, and operations of embodiments discussed herein. Each block may represent one or a combination of steps or executions in a process. Although the flowchart or process diagram of FIG. 11 illustrates an order, it is understood that the order may differ from that which is depicted. For example, an order of execution of two or more blocks may be scrambled relative to the order shown. Also, two or more blocks shown in succession in FIG. 11 may be performed concurrently or with partial concurrence. Further, in some embodiments, one or more of the blocks shown in FIG. 11 may be skipped or omitted.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

At least the following is claimed:

1. A device, comprising:
    a continuous-time extrema locator circuit that identifies an extrema of an analog input signal and generates an extrema pulse for the extrema of the analog input signal; and
    an analog memory that stores, in response to the extrema pulse, a time segment value and a potential value of the analog input signal, wherein different time segment values are stored in association with different extrema pulses, and further wherein the potential values of the analog input signal and the associated time segment values comprise a compressed representation of the analog input signal.

2. The device of claim 1, further comprising a time segment integrator that generates the time segment value in response to the extrema pulse, the time segment value being representative of a time period between the extrema pulse and a previous extrema pulse.

3. The device of claim 2, wherein the time segment integrator integrates charge over the time period between the extrema pulse and the previous extrema pulse.

4. The device of claim 1, wherein the continuous-time extrema locator circuit comprises:
    a rising transconductance circuit that tracks a rising slope of the analog input signal to identify a local maximum of the analog input signal; and
    a falling transconductance circuit that tracks a falling slope of the signal to identify a local minimum of the analog input signal.

5. The device of claim 1, wherein the continuous-time extrema locator circuit comprises a transconductance circuit that tracks slopes of the analog input signal to identify a local maximum of the analog input signal and a local minimum of the analog input signal.

6. The device of claim 4, wherein:
    the continuous-time extrema locator circuit generates an extrema pulse for each local maximum and local minimum of the analog input signal;
    the analog memory comprises an extrema value memory and a time segment memory;
    the analog memory stores the potential value in the extrema value memory based on each extrema pulse; and
    the analog memory stores the time segment value in the time segment memory based on each extrema pulse.

7. The device of claim 6, wherein each of the extrema and time segment value memories comprises an input buffer, an output buffer, a memory element access multiplexer, and plurality of memory elements.

8. The device of claim 1, further comprising:
    an analog wakeup event detector that generates a wakeup trigger signal based on a predetermined signal response of the pre-digitized analog input signal; and
    a wireless network node comprising a digital processing circuit that, in response to the wakeup trigger signal:
        reads the time segment values and potential values from the analog memory; and
        digitally processes the time segment values and potential values to reconstruct the analog input signal.

9. A method, comprising:
    sampling an analog signal by using a continuous-time extrema detector to identify an extrema of the analog input signal at an instantaneous Nyquist sampling rate of the analog input signal such that the analog input signal is compressed as compared to a global Nyquist sampling rate of the analog input signal;
    generating an extrema pulse for the extrema of the analog input signal; and
    in response to the extrema pulse:
        storing a potential value of the analog Input signal in an analog memory; and
        storing a time segment value in the analog memory, wherein different time segment values are stored in association with different extrema pulses, and further wherein the potential values of the analog input signal and the associated time segment values comprise a compressed representation of the analog input signal.

10. The method of claim 9, further comprising generating the time segment value in response to the extrema pulse, the time segment value being representative of a time period between the extrema pulse and a previous extrema pulse.

11. The method of claim 10, wherein generating the time segment value comprises integrating charge over the time period between the extrema pulse and the previous extrema pulse.

12. The method of claim 9, wherein sampling the analog input signal by identifying the extrema of the analog input signal comprises:
    tracking a rising slope of the analog input signal to identify a local maximum of the analog input signal; and
    tracking a falling slope of the analog input signal to identify a local minimum of the analog input signal.

13. The method of claim 9, wherein sampling the analog input signal by identifying the extrema of the analog input signal comprises tracking slopes of the analog input signal to identify a local maximum of the analog input signal and a local minimum of the analog input signal.

14. The method of claim 13, wherein storing the time segment values and potential values further comprises:
    generating an extrema pulse for each local maximum and local minimum of the analog input signal; and
    storing the time segment value and potential values in the analog memory based on each extrema pulse.

15. The method of claim 9, further comprising, in response to a wakeup trigger signal:
    reading, by a digital processing circuit, the time segment values and potential values from the memory; and
    digitally processing the time segment values and potential values to reconstruct the analog input signal.

16. A device, comprising:
a network node;
a wakeup event detector that generates a wakeup trigger signal for the network node based on a predetermined signal response of an analog signal generated by a sensor;
a continuous-time extrema locator circuit that identifies an extrema of the analog signal and generates an extrema pulse for the extrema of the analog signal; and
an analog memory that stores, in response to the extrema pulse, a time segment value and a potential value of the analog signal, wherein different time segment values are stored in association with different extrema pulses, and further wherein the potential values of the analog signal and the associated time segment values comprise a compressed representation of the analog signal.

17. The device of claim 16, wherein, in response to the wakeup trigger signal, a digital processing circuit of the network node:
reads the time segment values and potential values from the analog memory; and
digitally processes the time segment values and potential values to reconstruct the analog signal.

18. The device of claim 17, further comprising a time segment integrator that generates the time segment value in response to the extrema pulse, the time segment value being representative of a time period between the extrema pulse and a previous extrema pulse.

19. The device of claim 17, wherein:
the analog memory comprises an extrema value memory and a time segment memory; and
each of the extrema and time segment value memories comprises an input buffer, an output buffer, a memory element access multiplexer, and plurality of memory elements.

20. The device of claim 17, wherein the continuous-time extrema locator circuit comprises a transconductance circuit that tracks slopes of the analog signal to identify a local maximum of the analog signal and a local minimum of the analog signal.

* * * * *